UNITED STATES PATENT OFFICE.

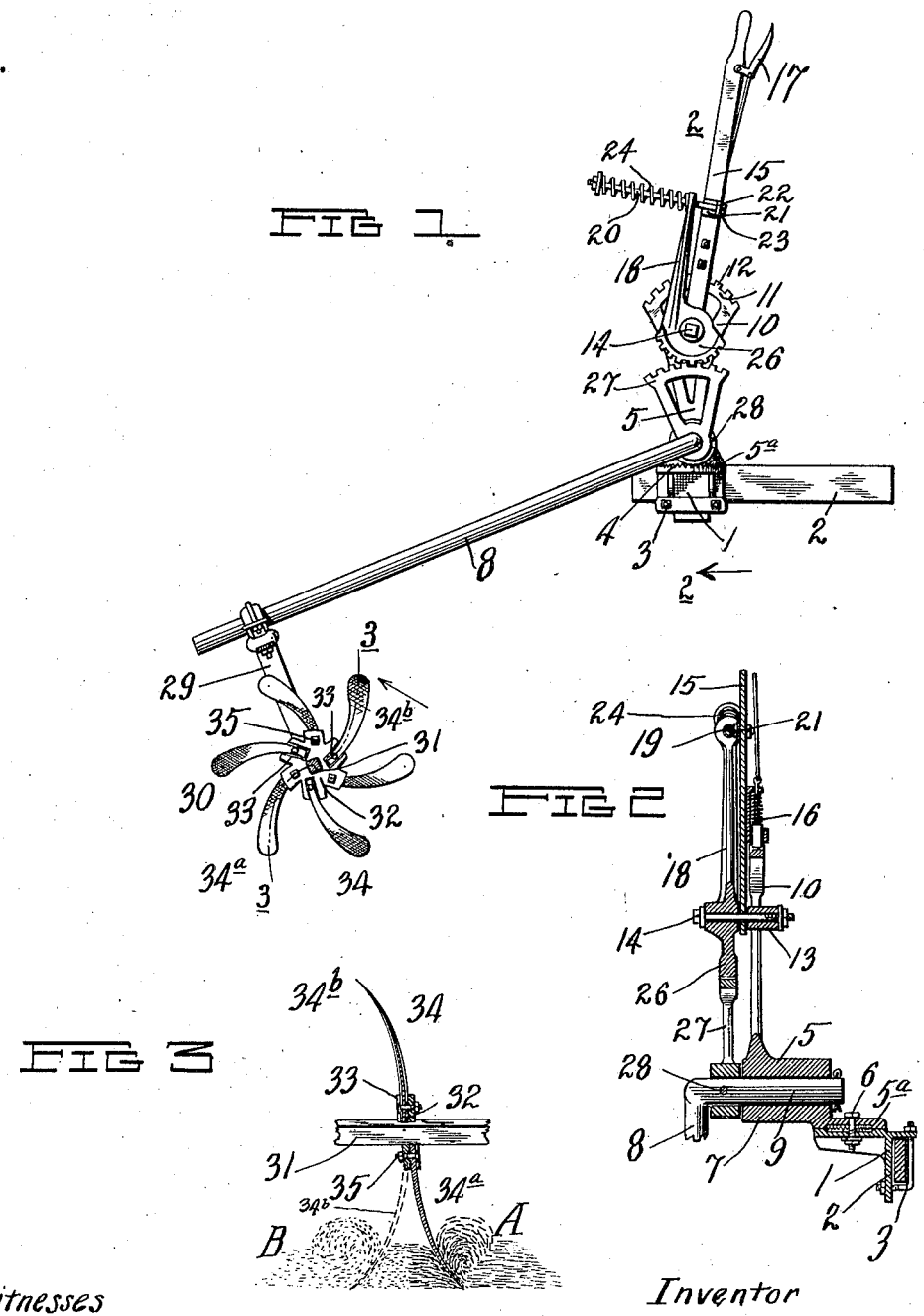

CHARLES H. MYERS, OF LE ROY, ILLINOIS, ASSIGNOR TO NATIONAL HARROW CO., OF LE ROY, ILLINOIS, A CORPORATION OF ILLINOIS.

HARROW ATTACHMENT FOR PLOWS.

1,002,172.  Specification of Letters Patent.  Patented Aug. 29, 1911.

Application filed December 27, 1909. Serial No. 534,971.

*To all whom it may concern:*

Be it known that I, CHARLES H. MYERS, a citizen of the United States, residing at Le Roy, in the county of McLean and State of Illinois, have invented certain new and useful Improvements in Harrow Attachments for Plows; and I do hereby declare that the following is a full, clear, and exact description of the invention, which will enable others skilled in the art to which it appertains to make and use the same.

This invention has reference to soil pulverizing or harrowing devices, especially applicable for attachment to gang or sulky plows, whereby the soil may be plowed, harrowed and leveled or smoothed at a single operation.

One of the objects of the present invention is a new and improved lifting device, as well as a pressure regulating device for a soil pulverizing or harrowing attachment for plows; wherein a convenient and easily manipulated lift is provided which may be operated by a person with little or no strain, and wherein the pressure upon the earth engaging members of the attachment may be varied and at the same time when said earth engaging members run into or over obstructions, the pressure device will relieve all strain upon the lift itself.

A further object of the present invention is an improved disk constituting the main element of the earth engaging means. Said improvement consists in constructing each disk of a plurality of blades, the alternate blades of which project or extend in opposite directions from their main support, whereby in the operation of a disk, instead of the blades throwing the dirt all in one direction, the blades will act upon the ground to more completely pulverize the same, by turning it over in opposite directions. Such construction enables me to rotate the disks in the line of draft rather than at an angle thereto.

In the accompanying drawings,—Figure 1 is a side elevation of my improved soil pulverizing or harrowing device with the parts in operative position; Fig. 2 is an enlarged vertical section on the line 2—2 of Fig. 1, showing the lifting mechanism in detail, Fig. 3 is a section on the line 3—3 of Fig. 1, showing the blades curved in opposite directions, and showing the manner in which the earth is thereby thrown in opposite directions.

Like numerals of reference indicate corresponding parts throughout the figures.

The device consists of a bracket designate as 1, which is attached to the frame part 2 of a gang or sulky plow by means of bolts 3. This bracket has the circular corrugated surface as at 4. The supporting or bearing bracket 5 has the portion 5$^a$ which is provided with a similar circular corrugated surface adapted to engage with the corrugated face of the bracket 1. Said bracket 5 is pivotally attached to the bracket 1 by means of bolt 6 The bracket 5 has the bearing portion 7 in which is journaled the end 9 of a rocking rod, swing arm or connecting bar 8, said end being bent at right angles to the length of said bar substantially as shown in Fig. 2.

Provided to be carried on the bearing 7 of the bracket 5 is the supporting standard or frame 10 which may either be an integral part of the bracket 5 or immovably fixed thereto, preferably the former. The standard 10 has its upper edge 11 formed in the shape of an arc, said edge having a plurality of teeth or lugs 12 projecting therefrom. Arranged horizontally and with its axis at the center of the arc formed by the upper edge 11 of the standard 10 is the bearing 13 which is formed as an integral part of said standard 10. Carried or journaled in said bearing 13 is the bolt or pivot 14. A manually operated lever 15 is fulcrumed on the said pivot 14, said lever having thereon locking means 16, adapted to engage with the teeth or lugs 12 of the standard 10 for the purpose of locking the lever in any desired position, said locking means being controlled by the hand hold 17. Pivoted also on the bolt 14 is the oscillating lever or arm 18 so situated on the outer end of the bolt 14 that the lever 15 comes between the bearing 13 of the standard 10 and the said lever or arm 18, said arm having in its upper end the eye 19. Secured to the lever 15 and in proximity to the eye 19 of arm 18 is the bracket or angle plate 21 with the laterally extending ear 22, the relation of the position of the lever 15 to the lever 18 being such as to bring said ear 22 adjacent to the forward face of the eye 19 of the lever 18.

Provided to pass through an opening in the ear 22 and through the eye 19 and extend rearwardly in an approximately horizontal position is the bolt 20. Said bolt 20 has the head 23, which comes in contact with the forward face of the ear 22, said face being that non-adjacent the eye 19. Surrounding that portion of the bolt 20 extending to the rear of the eye 19 is the spring 24, the forward end of which bears against the eye 19 and the rear end of which bears against a nut carried on said bolt 20.

Formed integrally with the lower end of the lever 18 is the segmental gear 26 concentric with the pivot or bolt 14 and so that oscillation of lever 18 about the said pivot 14 rotates the gear 26 about the same center. Formed to intermesh with the gear 26 is the segmental gear 27 said gear being carrier on the portion 9 of the rod 8 and immovably fixed thereto by means of bolt or pin 28, oscillation of said segment 27 swing the arm or bar 8 in its bearing 7.

Carried on the rear end of the rocking rod or connecting bar 8 in any suitable manner is the frame 29 which carries or supports the soil pulverizing or earth engaging means 30. Said means 30 consists preferably of the rotating shaft 31 having fixed thereto at suitable intervals the hub portions 32. Arranged alternately in the opposite faces of the hub 32 is a plurality of sockets 33 into each of which fits the root or shank of a pulverizer blade 34 said blade being secured therein by bolts 35. The blades 34 are of two styles, 34ᵃ and 34ᵇ, the former, 34ᵃ curving outwardly toward the right looking at Fig. 3, and the latter, 34ᵇ curving outwardly toward the left looking at the same figure. The sockets 33 are so arranged that the socket holding a blade curving to the right is on the right side of the hub 32 while those curving to the left are held by sockets on the left side of the hub. The advantage of this arrangement is seen in Fig. 3 where it is shown how the blades 34ᵃ curving toward the right throw the dirt in that direction as at A while blades 34ᵇ throw the dirt to the left as at B. The alternate arrangement of the blades also makes it possible to allow the plane of rotation of each set of blades to be parallel with the line of draft of the plow. The real object of the alternate arrangement is to more completely pulverize the earth and to mix it more thoroughly by throwing part in one direction and part in another.

The device as shown in Fig. 1 is in operative position, with the pulverizing means engaging the earth. The mechanism was set in this position by throwing the lever 15 forward, thus drawing the bolt 20 forward and compressing the spring 24, said compression of the spring acting against the lever 18 and tending to yieldingly force it forward. The forward movement of the upper part of the lever 18 causes the gear 26 to drive the gear segment 27 rearwardly, thereby through the fixed relation between the gear segment 27 and the rod 8, forcing the rear end of the rod downward and bringing the pulverizing means 30 in engagement with the earth. Any sudden obstruction in the earth will cause the lever 18 to act against the spring 24 which will absorb the shock and relieve the mechanism of any jolting strain.

To raise the device to inoperative position, the lever 15 is oscillated toward the rear and coming into direct contact with the lever 18 oscillates the said lever 18 in the same direction, causing the segment 27 to rotate forwardly through its engagement with gear 26, and thereby raising the outer end of the rod 8 and the pulverizing means therewith.

Having thus fully described my invention, what I claim and desire to secure by Letters Patent of the United States, is,—

1. A plow attachment, comprising a standard formed with a rack, an arm pivotally connected with the standard and adapated to carry earth engaging members, a lever fulcrumed to the standard, a second lever having its fulcrum concentric with the fulcrum of said first lever, said second lever operatively connecting at one end portion with the arm, and resilient means for operatively connecting the opposite end portion of the second lever with the first lever.

2. A plow attachment, comprising a standard formed with a rack, an arm pivotally connected with the standard and adapted to carry earth engaging members, a lever fulcrumed to the standard, a member having a fixed connection with said arm, a lever having its fulcrum concentric with the fulcrum of said first mentioned lever and operatively connecting at one end portion with the member on the arm, and resilient means for operatively connecting the opposite end portion of said lever with the first mentioned lever.

3. A plow attachment, comprising a standard having a rack, an arm having an angularly disposed end which is pivotally connected with said standard, said arm being adapted to carry earth engaging members, a lever fulcrumed to the standard, a member having a fixed relation with the angularly disposed end of the arm, a second lever having its fulcrum concentric with the fulcrum of said first lever, gearing connecting one end portion of said second lever with said member on the arm, and resilient means for operatively connecting the opposite end portion of said second lever with said first mentioned lever.

4. A plow attachment, comprising a standard having a rack, an arm having an angularly disposed end which is pivotally connected with the said standard, said arm being adapted to carry earth engaging members, a lever fulcrumed to the standard, a member having a fixed connection with the angularly disposed end of the arm and provided with a segment gear, a second lever having its fulcrum concentric with the fulcrum of said first lever and provided with a segment gear in mesh with the gear of the member, and means operatively connecting the opposite end portion of said second lever with the said first lever.

5. A plow attachment, comprising a standard having a rack, an arm pivotally attached to said standard and adapted to carry earth engaging members, a lever fulcrumed to the standard, a second lever having its fulcrum concentric with the fulcrum of said first lever, a connection between one end portion of said second lever and said arm, and a connection between the opposite end portion of said second lever and said first lever.

6. A plow attachment comprising a standard having a rack, an arm pivotally attached to said standard and adapted to carry earth engaging members, a lever fulcrumed to the standard, a second lever having its fulcrum concentric with the fulcrum of said first lever, means operatively connecting one end portion of said second lever with the arm, a rod connected with the first lever and passing through the opposite end portion of said second lever, and a spring encircling the rod with one end in engagement with the second lever.

In testimony whereof I affix my signature, in presence of two witnesses.

CHARLES H. MYERS.

Witnesses:
A. J. KEENEN,
TOM HUFFMON.

---

Copies of this patent may be obtained for five cents each, by addressing the "Commissioner of Patents, Washington, D. C."